United States Patent
Santoso et al.

(10) Patent No.: US 8,307,631 B2
(45) Date of Patent: Nov. 13, 2012

(54) COLD START HYDROCARBON EMISSION REDUCTION CONTROL STRATEGY FOR ACTIVE HYDROCARBON ADSORBER

(75) Inventors: Halim G. Santoso, Novi, MI (US); Kevin J. Storch, Brighton, MI (US)

(73) Assignee: GM Global Technology Operations LLC

( * ) Notice: Subject to any disclaimer, the term of this patent is extended or adjusted under 35 U.S.C. 154(b) by 353 days.

(21) Appl. No.: 12/791,966

(22) Filed: Jun. 2, 2010

(65) Prior Publication Data

US 2011/0296814 A1 Dec. 8, 2011

(51) Int. Cl.
*F01N 3/031* (2006.01)

(52) U.S. Cl. ........... 60/284; 60/274; 60/287; 60/288; 60/296; 60/297; 60/324

(58) Field of Classification Search ............ 60/274, 60/284, 287, 288, 296, 297, 299, 301, 324; 137/601.17
See application file for complete search history.

(56) References Cited

U.S. PATENT DOCUMENTS

| | | | | |
|---|---|---|---|---|
| 5,398,503 | A * | 3/1995 | Danno et al. | 60/288 |
| 6,253,547 | B1 * | 7/2001 | Watanabe et al. | 60/297 |
| 6,321,533 | B1 * | 11/2001 | Watanabe et al. | 60/324 |
| 6,327,852 | B1 | 12/2001 | Hirose | |
| 6,370,872 | B1 * | 4/2002 | Watanabe et al. | 60/288 |
| 6,397,586 | B1 | 6/2002 | Sakurai et al. | |
| 6,401,451 | B1 * | 6/2002 | Yasui et al. | 60/277 |
| 6,799,420 | B2 * | 10/2004 | Ueno et al. | 60/277 |
| 7,341,699 | B2 | 3/2008 | Thieman et al. | |
| 7,444,803 | B2 | 11/2008 | Iwamoto et al. | |
| RE42,156 | E * | 2/2011 | Hirota et al. | 60/288 |
| 2002/0100274 | A1 * | 8/2002 | Ueno et al. | 60/288 |
| 2008/0249698 | A1 * | 10/2008 | Yokoyama et al. | 701/107 |
| 2009/0183498 | A1 * | 7/2009 | Uchida et al. | 60/288 |
| 2010/0077735 | A1 * | 4/2010 | Tanaka | 60/287 |
| 2010/0132340 | A1 * | 6/2010 | Sano et al. | 60/288 |
| 2011/0192138 | A1 * | 8/2011 | Bailey et al. | 60/274 |

OTHER PUBLICATIONS

Office Action regarding U.S. Appl. No. 12/791,919 mailed Apr. 12, 2012.
Keisure Sano, Takashi Kawai, Satoshi Yoshizaki and Yasunori Iwamoto; SAE Technical Paper Series 2007-01-0929; "HC Adsorber System for SULEVs of Large Volume Displacement"; Apr. 16-19, 2007; 8 pages.
U.S. Appl. No. 12/791,919, filed Jun. 2, 2010, Halim G. Santoso et al.

* cited by examiner

*Primary Examiner* — Kenneth Bomberg
*Assistant Examiner* — Jorge Leon, Jr.

(57) ABSTRACT

A control system may include an adsorber bypass evaluation module, an adsorber bypass control module and an engine operation control module. The adsorber bypass evaluation module may evaluate a bypass closing criterion of a hydrocarbon adsorber bypass passage in an engine exhaust gas treatment device after an engine key-on condition. The adsorber bypass control module may be in communication with the adsorber bypass evaluation module and may close the hydrocarbon adsorber bypass passage after the key-on condition when the bypass closing criterion meets a predetermined condition. The engine operation control module may be in communication with the adsorber bypass control module and may start the engine after the closing.

16 Claims, 5 Drawing Sheets

COLD START HYDROCARBON EMISSION REDUCTION CONTROL STRATEGY FOR ACTIVE HYDROCARBON ADSORBER

FIELD

The present disclosure relates to engine exhaust systems, and more specifically, to control strategies for engine exhaust gas treatment devices including hydrocarbon adsorbers.

BACKGROUND

This section provides background information related to the present disclosure which is not necessarily prior art.

Engine emissions standards include limits on hydrocarbon emissions. Hydrocarbon emissions may be difficult to treat at cold start operating conditions due to available temperature of catalysts used to treat hydrocarbon emissions. Engine exhaust gas treatment devices may include a hydrocarbon adsorber to trap hydrocarbon emissions during cold operation and treat the hydrocarbon emissions once the catalyst reaches an operating temperature.

SUMMARY

A method of controlling an engine exhaust gas treatment device may include evaluating a bypass closing criterion of a hydrocarbon adsorber bypass passage in an engine exhaust gas treatment device after an engine key-on condition. The hydrocarbon adsorber bypass passage may be closed after the key-on condition when the bypass closing criterion meets a predetermined condition. The engine may be started after the closing.

A control system may include an adsorber bypass evaluation module, an adsorber bypass control module and an engine operation control module. The adsorber bypass evaluation module may evaluate a bypass closing criterion of a hydrocarbon adsorber bypass passage in an engine exhaust gas treatment device after an engine key-on condition. The adsorber bypass control module may be in communication with the adsorber bypass evaluation module and may close the hydrocarbon adsorber bypass passage after the key-on condition when the bypass closing criterion meets a predetermined condition. The engine operation control module may be in communication with the adsorber bypass control module and may start the engine after the closing.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only and are not intended to limit the scope of the present disclosure in any way.

Corresponding reference numerals indicate corresponding parts throughout the several views of the drawings.

DETAILED DESCRIPTION

Examples of the present disclosure will now be described more fully with reference to the accompanying drawings. The following description is merely exemplary in nature and is not intended to limit the present disclosure, application, or uses.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

When an element or layer is referred to as being "on," "engaged to," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term "module" refers to an application specific integrated circuit (ASIC), an electronic circuit, a processor (shared, dedicated, or group) and memory that execute one or more software or firmware programs, or a combinational logic circuit.

Figure 1:
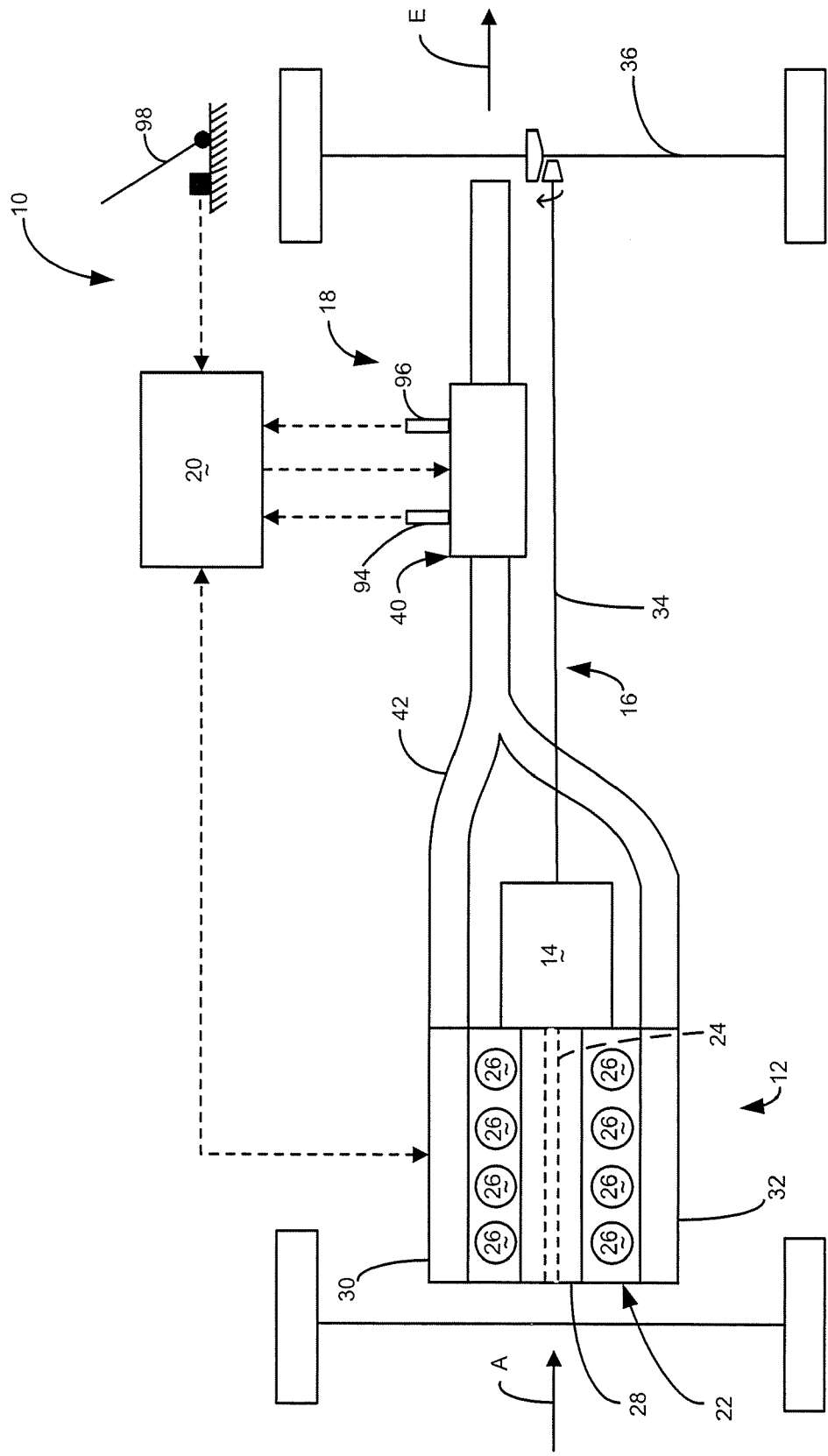
FIG. 1 is a schematic illustration of a vehicle according to the present disclosure.

Referring to FIG. 1, an exemplary vehicle 10 may include an engine assembly 12, a transmission 14, a driveline assembly 16, an exhaust assembly 18, and a control module 20. The engine assembly 12 may include an internal combustion engine 22 having a crankshaft 24 rotationally driven by pistons 26, an intake manifold 28 providing an air flow (A) to the engine 22 and exhaust manifolds 30, 32 receiving exhaust gas (E) exiting the engine 22. The driveline assembly 16 may include an output shaft 34 and a drive axle 36. The engine 22 may be coupled to the transmission 14 to drive the output shaft 34 and power rotation of the drive axle 36.

Figure 2:
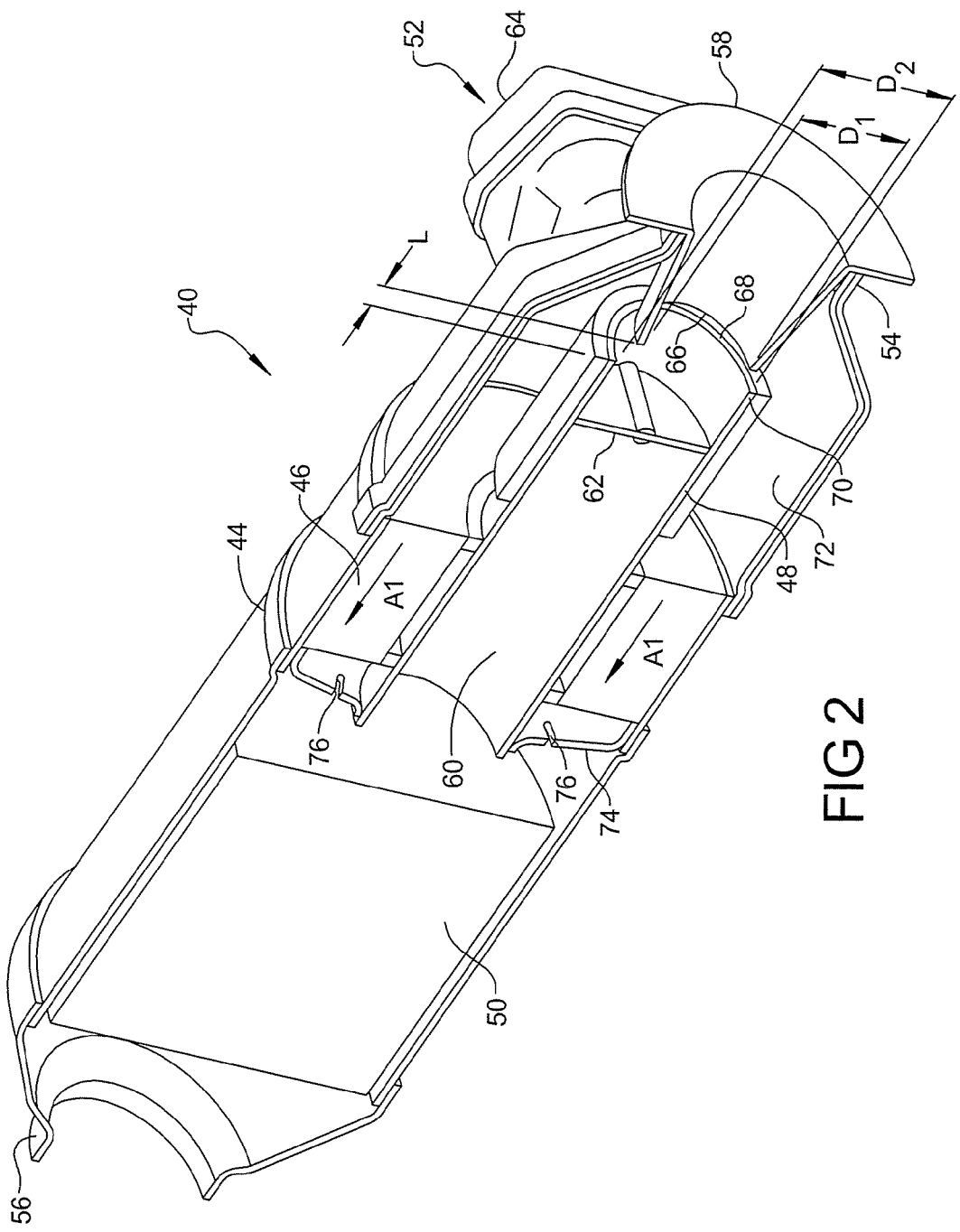
FIG. 2 is perspective section view of an engine exhaust gas treatment device shown in FIG. 1.
Figure 3:
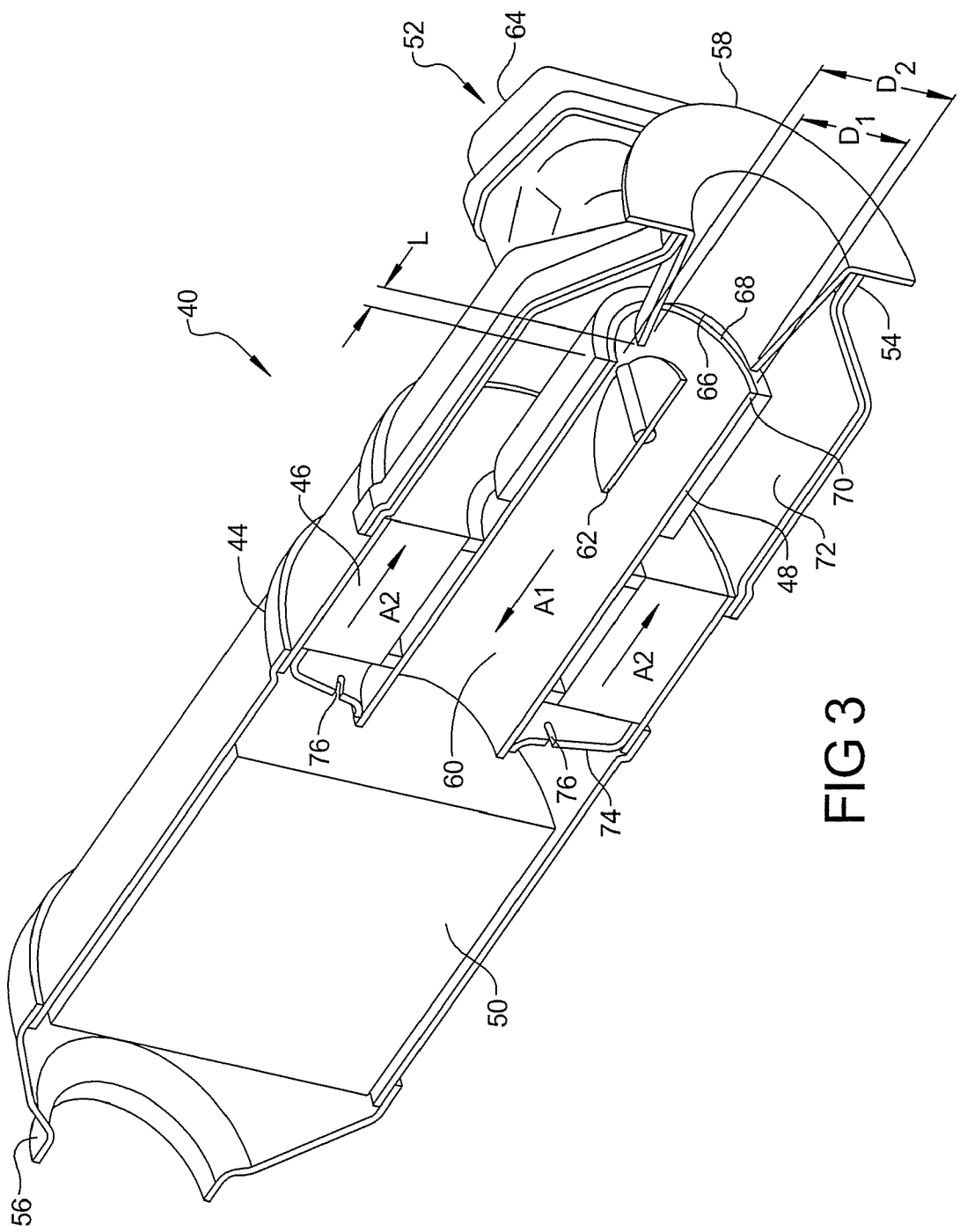
FIG. 3 is an additional perspective section view of the engine exhaust gas treatment device shown in FIG. 1.

The exhaust assembly 18 may include an engine exhaust gas treatment device 40 in communication with the exhaust manifolds 30, 32 via an exhaust gas conduit 42. With reference to FIGS. 2 and 3, the engine exhaust gas treatment device 40 may include a housing 44, a hydrocarbon adsorber 46, an adsorber bypass conduit 48, a catalyst member 50, and a bypass valve assembly 52. The housing 44 may define an exhaust gas inlet 54 and an exhaust gas outlet 56 and may include a nozzle 58 at the exhaust gas inlet 54. The hydrocarbon adsorber 46 may be located within the housing 44 between the exhaust gas inlet 54 and an exhaust gas outlet 56 forming a first flow path between the exhaust gas inlet 54 and the exhaust gas outlet 56. By way of non-limiting example, the hydrocarbon adsorber 46 may be formed from a zeolite material. In the present non-limiting example, the zeolite material may be for treatment of ethanol emissions. The catalyst member 50 may include a three-way catalyst.

The adsorber bypass conduit 48 may extend through the hydrocarbon adsorber 46 and define an adsorber bypass passage 60. The adsorber bypass passage 60 defines a second flow path between the exhaust gas inlet 54 and the exhaust gas outlet 56 parallel to the first flow path defined through the hydrocarbon adsorber 46.

The catalyst member 50 may be located between the hydrocarbon adsorber 46 and the adsorber bypass conduit 48 and the exhaust gas outlet 56. The catalyst member 50 may receive exhaust gas exiting the hydrocarbon adsorber 46 and/or the adsorber bypass conduit 48 depending on the position of the bypass valve assembly 52 as discussed below.

The bypass valve assembly 52 may include an electrically actuated bypass valve 62 located in the adsorber bypass passage 60 and an electric actuation mechanism 64 engaged with the electrically actuated bypass valve 62 to displace the electrically actuated bypass valve 62 between a closed position (FIG. 2) and an open position (FIG. 3). The electrically actuated bypass valve 62 provides communication between the exhaust gas inlet 54 and the exhaust gas outlet 56 when in the open position and inhibits (or prevents) communication between the exhaust gas inlet 54 and the exhaust gas outlet 56 when in the closed position.

The nozzle 58 may form a converging nozzle including a nozzle outlet 66 defining a first inner diameter (D1). The nozzle outlet 66 may be located adjacent to an inlet 68 of the adsorber bypass passage 60 defined at an end 70 of the adsorber bypass conduit 48. The nozzle outlet 66 and the inlet 68 of the adsorber bypass passage 60 may define a spacing therebetween. The nozzle outlet 66 may be concentrically aligned with the inlet 68 of the adsorber bypass passage 60.

The inlet 68 of the adsorber bypass passage 60 may define a second inner diameter (D2). The first inner diameter (D1) may be less than the second inner diameter (D2). By way of non-limiting example, the first inner diameter (D1) may be eighty percent to ninety-nine percent of the second inner diameter (D2), and more specifically eighty percent to ninety-five percent of the second inner diameter (D2). The nozzle outlet 66 may also be axially spaced a distance (L) from the inlet 68 of the adsorber bypass passage 60. In the present non-limiting example, the nozzle outlet 66 is axially spaced less than 10 millimeters from the inlet 68 of the adsorber bypass passage 60. The difference between the first and second inner diameters (D1, D2) and/or distance (L) may form the spacing between the nozzle outlet 66 and the inlet 68 of the adsorber bypass passage 60.

The end 70 of the adsorber bypass conduit 48 defining the inlet 68 may extend axially outward from the hydrocarbon adsorber 46 in a direction from the exhaust gas outlet 56 toward the exhaust gas inlet 54. The housing 44 may define an annular chamber 72 surrounding the adsorber bypass conduit 48 at a location axially between the inlet 68 of the adsorber bypass passage 60 and the hydrocarbon adsorber 46. The annular chamber 72 may be in communication with the exhaust gas inlet 54 through the spacing defined between the nozzle outlet 66 and the inlet 68 of the adsorber bypass passage 60.

Figure 4:
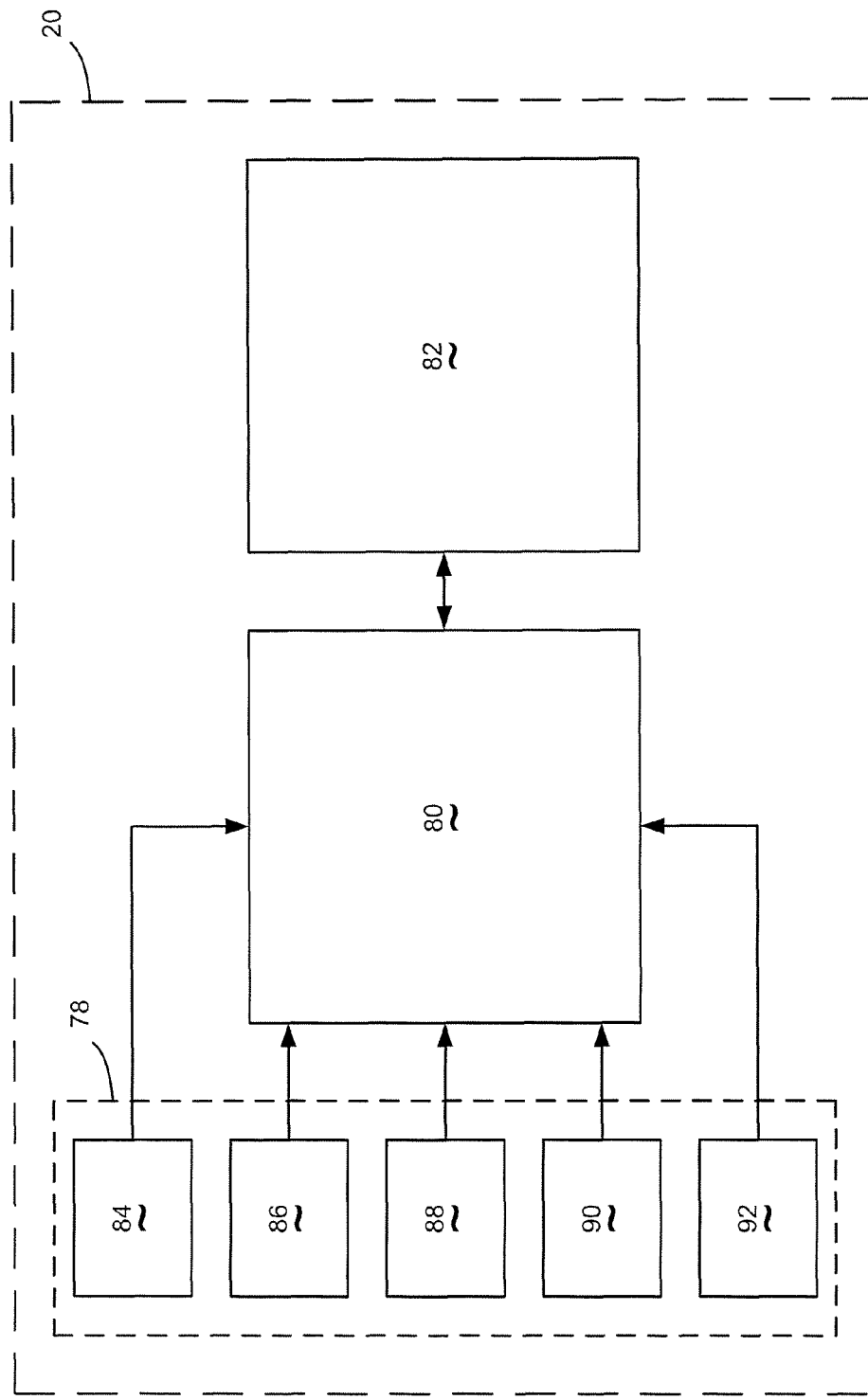
FIG. 4 is a schematic illustration of the control module of the vehicle assembly shown in FIG. 1.

As seen in FIG. 4, the control module 20 may include an adsorber bypass evaluation module 78, an adsorber bypass control module 80 and an engine operation control module 82. The adsorber bypass evaluation module 78 may be in communication with the adsorber bypass control module 80. More specifically, the adsorber bypass evaluation module 78 may include an adsorber evaluation module 84, a catalyst evaluation module 86, an engine torque evaluation module 88, an accelerator pedal evaluation module 90 and an ambient temperature evaluation module 92.

The adsorber evaluation module 84 may be in communication with a first temperature sensor 94 (FIG. 1) coupled to the engine exhaust gas treatment device 40 and providing an operating temperature (T1) of the hydrocarbon adsorber 46. The catalyst evaluation module 86 may be in communication with a second temperature sensor 96 (FIG. 1) coupled to the engine exhaust gas treatment device 40 and providing an operating temperature (T2) of the catalyst member 50. The engine torque evaluation module 88 may determine an engine torque output. The accelerator pedal evaluation module 90 may be in communication with a vehicle accelerator pedal 98 (FIG. 1) and may determine a position of the accelerator pedal 98. The ambient temperature evaluation module 92 may determine ambient temperature (T3).

The operating temperature (T1) of the hydrocarbon adsorber 46, the operating temperature (T2) of the catalyst member 50, the engine torque output and the position of the accelerator pedal 98 may each be evaluated by the adsorber bypass evaluation module 78 as discussed below. The adsorber bypass control module 80 and the engine operation control module 82 may be in communication with one another. The adsorber bypass control module 80 may receive a signal from the adsorber bypass evaluation module 78 indicative of the adsorber bypass closing criterion. The adsorber bypass control module 80 may be in communication with the electric actuation mechanism 64 engaged with the electrically actuated bypass valve 62 to displace the electrically actuated bypass valve 62 between the closed position (FIG. 2) and the open position (FIG. 3). The engine operation control module 82 may control engine operation and may control timing of engine on and off conditions based on a signal indicative of the opening or closing of the adsorber bypass passage 60 provided by the adsorber bypass control module 80 as discussed below.

Figure 5:
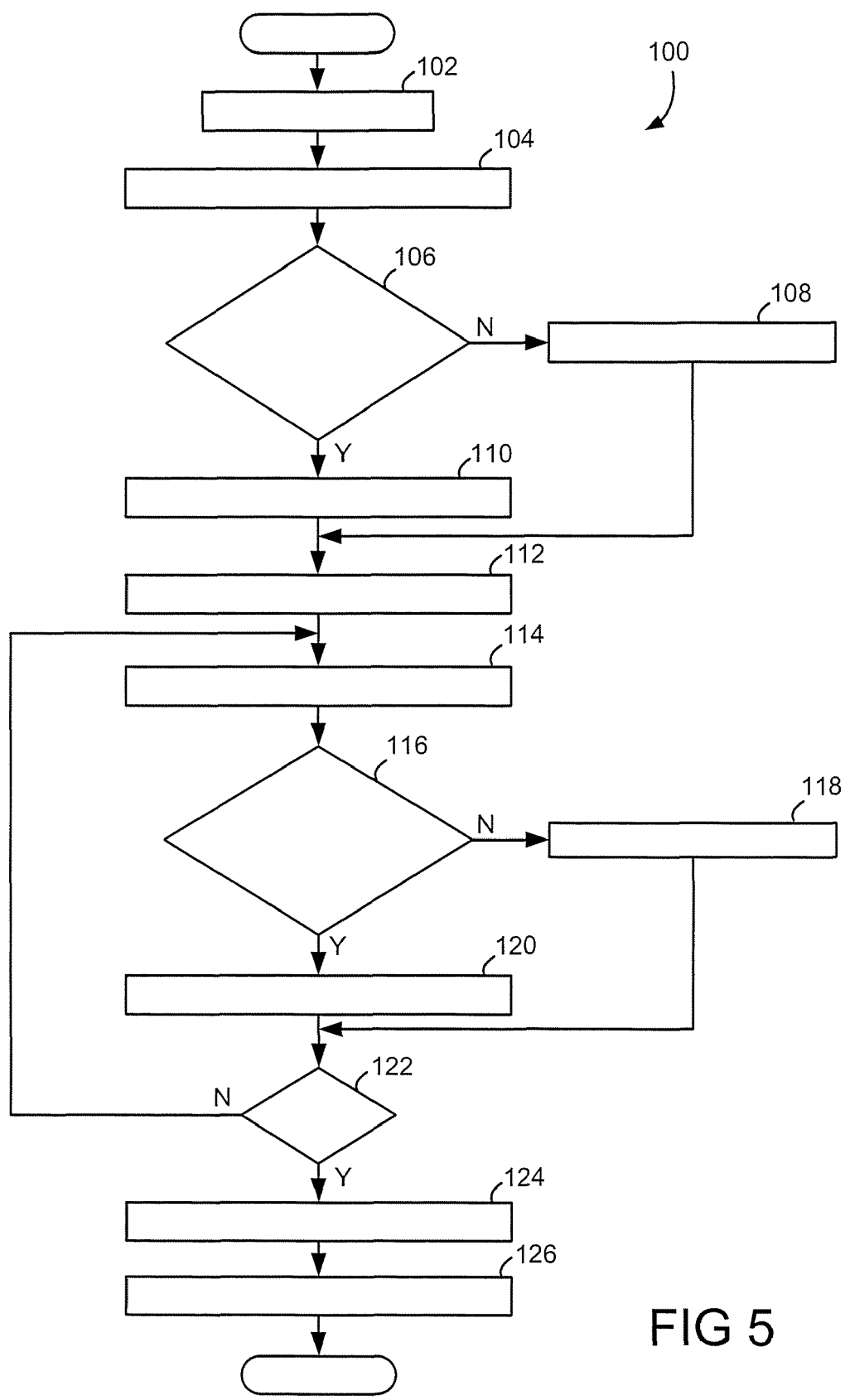
FIG. 5 is an illustration of control logic for the vehicle of FIG. 1.

Control logic 100 for operation of the vehicle 10 is illustrated in FIG. 5. Control logic 100 may begin at block 102 where vehicle key-on is initiated. Vehicle key-on may generally include a user initiating an engine start condition and may correspond to a cold start condition. The adsorber bypass passage 60 may be open at key-on. Control logic 100 may then proceed to block 104 where the adsorber bypass evaluation module 78 evaluates bypass closing criterion for the hydrocarbon adsorber 46. The bypass closing criterion may generally include criterion for closing the adsorber bypass passage 60. The bypass closing criterion evaluated at block 104 may include ambient temperature. Block 106 determines if the bypass closing criterion is met.

Control logic 100 may proceed to block 108 when the bypass closing criterion is not met. Bypass closing criterion may not be met when the ambient temperature (T3) is below a first predetermined limit ($T_{limit1}$). In the present non-limiting example, control logic 100 may proceed to block 108 when the ambient temperature (T3) is less than zero degrees Celsius. Alternatively, the bypass closing criterion may not be met when the ambient temperature (T3) is above a second predetermined limit ($T_{limit2}$). In the present non-limiting example, control logic 100 may proceed to block 108 when the ambient temperature (T3) is greater than sixty degrees Celsius. The adsorber bypass passage 60 may be maintained open at block 108. The exhaust gas provided by the engine 22 may bypass the hydrocarbon adsorber 46 when the adsorber bypass passage 60 is open and proceed to the catalyst member 50. The adsorber bypass passage 60 may be maintained in the open position by having the electrically actuated bypass valve 62 in the open position.

When the ambient temperature (T3) is below the first predetermined limit ($T_{limit1}$), the electrically actuated bypass valve 62 may be in the open position to prevent the electrically actuated bypass valve 62 being frozen shut in the closed position. When the ambient temperature (T3) is above the second predetermined limit ($T_{limit2}$), the adsorber bypass passage 60 may be open because hydrocarbon emissions may not be an issue at ambient temperatures greater than sixty degrees Celsius. Control logic 100 may then proceed to block 112 where the engine 22 is started.

Control logic 100 may proceed to block 110 when the bypass closing criterion is met. Bypass closing criterion may be met when the ambient temperature (T3) is between the first and second predetermined limits ($T_{limit1}$, $T_{limit2}$). In the present non-limiting example, control logic 100 may proceed to block 110 when the ambient temperature (T3) is between zero degrees Celsius and sixty degrees Celsius. The adsorber bypass passage 60 may be closed at block 108. The adsorber bypass passage 60 may be closed by displacing the electrically actuated bypass valve 62 from the open position to the closed position via the electric actuation mechanism 64. The exhaust gas provided by the engine 22 may be forced through the hydrocarbon adsorber 46 when the adsorber bypass passage 60 is closed before proceeding to the catalyst member 50. Control logic 100 may then proceed to block 112 where the engine 22 is started.

After the engine 22 is started, control logic 100 may proceed to block 114 where bypass closing criterion is again evaluated. The bypass closing criterion evaluated at block 114 may include the operating temperature (T1) of the hydrocarbon adsorber 46, the operating temperature (T2) of the catalyst member 50, the engine torque output and/or the position of the accelerator pedal 98. Block 116 determines if the bypass closing criterion is met.

In a first example, the bypass closing criterion may be met when the operating temperature (T2) of the catalyst member 50 is less than three hundred degrees Celsius. The operating temperature (T1) of the hydrocarbon adsorber 46 may also be greater than three hundred degrees Celsius when the operating temperature (T2) of the catalyst member 50 is greater than three hundred degrees Celsius.

In a second example, the bypass closing criterion may be based on engine torque output. A desired engine torque output may be determined by the engine torque evaluation module 88 and evaluated relative to a predetermined limit. The adsorber bypass passage 60 may be opened when the determined engine torque output is greater than the predetermined limit and may remain in the closed position when the determined engine torque output is below the predetermined limit. In a third example, the bypass closing criterion may be based on the position of the accelerator pedal 98. A position of the accelerator pedal 98 may be determined by the accelerator pedal evaluation module 90. The adsorber bypass passage 60 may be opened when the position of the accelerator pedal 98 is greater than fifty percent of a maximum accelerator pedal position and may remain in the closed position when the position of the accelerator pedal 98 is less than fifty percent of the maximum accelerator pedal position.

Control logic 100 may proceed to block 118 when the bypass closing criterion is not met. The adsorber bypass passage 60 may be opened or maintained in the open position at block 118. The bypass closing criterion may not be met when the operating temperature (T2) of the catalyst member 50 is less than three hundred degrees Celsius. The operating temperature (T1) of the hydrocarbon adsorber 46 may also be greater than three hundred degrees Celsius when the operating temperature (T2) of the catalyst member 50 is greater than three hundred degrees Celsius.

The exhaust gas provided by the engine 22 may bypass the hydrocarbon adsorber 46 when the adsorber bypass passage 60 is open and proceed to the catalyst member 50. A portion of the exhaust gas provided by the engine 22 may flow through the hydrocarbon adsorber 46 in a reverse direction (discussed below) to purge hydrocarbons stored within the hydrocarbon adsorber 46 when the adsorber bypass passage 60 is open. The adsorber bypass passage 60 may be opened by having the electrically actuated bypass valve 62 in the open position. Control logic 100 may then proceed to block 122 where vehicle operation is evaluated.

Control logic 100 may proceed to block 120 when the bypass closing criterion is met. The adsorber bypass passage 60 may be closed or maintained in the closed position at block 118. The exhaust gas provided by the engine 22 may bypass the hydrocarbon adsorber 46 when the adsorber bypass passage 60 is open and proceed to the catalyst member 50. The adsorber bypass passage 60 may be closed by having the electrically actuated bypass valve 62 in the closed position. Control logic 100 may then proceed to block 122 where vehicle operation is evaluated.

If vehicle key-off is initiated, control logic 100 may proceed to block 124. Otherwise, control logic 100 may return to block 114 where bypass closing criterion is again evaluated. Vehicle key-off may generally include a user initiating an engine off condition. The adsorber bypass passage 60 may be opened or maintained open at block 124 for a subsequent key-on condition. Control logic 100 may then proceed to block 126 where the engine 22 is shut off. Control logic 100 may then terminate. Alternatively, the adsorber bypass passage 60 may be opened or maintained open via the electric actuation mechanism 64 after the engine is shut off.

When the electrically actuated bypass valve 62 is in the closed position (FIG. 2), the exhaust gas may flow through the hydrocarbon adsorber 46 in a first direction (A1) from the exhaust gas inlet 54 to the exhaust gas outlet 56. The exhaust gas may flow from the exhaust gas inlet 54 through the hydrocarbon adsorber 46 to the catalyst member 50 and out the exhaust gas outlet 56. The housing 44 may include a diffuser 74 between the hydrocarbon adsorber 46 and the catalyst member 50 and defining openings 76 to control exhaust flow rate through the hydrocarbon adsorber 46.

When the electrically actuated bypass valve 62 is in the open position (FIG. 3), the exhaust gas may flow through the hydrocarbon adsorber 46 in a second direction (A2) opposite the first direction (A1) and from the exhaust gas outlet 56 to the exhaust gas inlet 54. The exhaust gas flows through the adsorber bypass passage 60 in the first direction (A1) to the catalyst member 50 and out the exhaust gas outlet 56. The exhaust gas may flow through the hydrocarbon adsorber 46 in the second direction (A2) may be generated by the arrangement between the nozzle outlet 66 and the inlet 68 of the adsorber bypass conduit 48. More specifically, the spacing between the nozzle outlet 66 and the inlet 68 of the adsorber bypass conduit 48 may create a localized low pressure region within the annular chamber 72. As a result, a portion of the exhaust gas may flow from the higher pressure region of the housing 44 between the hydrocarbon adsorber 46 and the catalyst member 50 through the hydrocarbon adsorber 46 in the second direction (A2). The exhaust gas may flow to the adsorber bypass conduit 48 through the spacing defined between the nozzle outlet 66 and the inlet 68 of the adsorber bypass conduit 48.

What is claimed is:

1. A method comprising:
   evaluating a bypass closing criterion of a hydrocarbon adsorber bypass passage in an engine exhaust gas treatment device after an engine key-on condition, the bypass closing criterion including an ambient temperature;
   closing the hydrocarbon adsorber bypass passage after the key-on condition when the bypass closing criterion meets a predetermined condition; and
   starting the engine after the closing, the hydrocarbon adsorber bypass passage being in a closed condition during the starting the engine when the ambient temperature is above 0 degrees Celsius and the hydrocarbon adsorber bypass passage being in an open condition during the starting the engine when the ambient temperature is below 0 degrees Celsius.

2. The method of claim 1, wherein the closing includes displacing a valve within the hydrocarbon adsorber bypass passage to a closed position.

3. The method of claim 1, wherein the hydrocarbon adsorber bypass passage is open at the key-on condition.

4. The method of claim 1, further comprising determining an engine torque output and opening the hydrocarbon adsorber bypass passage after the closing when the determined engine torque output is greater than a predetermined limit.

5. The method of claim 1, further comprising determining a vehicle accelerator pedal position and opening the hydrocarbon adsorber bypass passage when the vehicle accelerator pedal position is greater than 50 percent of a maximum vehicle accelerator pedal position.

6. The method of claim 1, further comprising determining an operating temperature of a catalyst of the engine exhaust gas treatment device and opening the hydrocarbon adsorber bypass passage when the operating temperature is greater than 300 degrees Celsius.

7. The method of claim 6, wherein exhaust gas flows in a first direction through a hydrocarbon adsorber of the exhaust gas treatment device when the adsorber bypass passage is closed and the exhaust gas flows in a second direction opposite the first direction through the hydrocarbon adsorber when the adsorber bypass passage is open.

8. The method of claim 7, wherein the hydrocarbon adsorber is operating at a temperature greater than 300 degrees Celsius when the exhaust gas flows through the hydrocarbon adsorber in the second direction.

9. A control system comprising:
   an adsorber bypass evaluation module that evaluates a bypass closing criterion of a hydrocarbon adsorber bypass passage in an engine exhaust gas treatment device after an engine key-on condition, the bypass closing criterion including an ambient temperature;
   an adsorber bypass control module in communication with the adsorber bypass evaluation module that closes the hydrocarbon adsorber bypass passage after the key-on condition when the bypass closing criterion meets a predetermined condition; and
   an engine operation control module in communication with the adsorber bypass control module that starts the engine after the closing, the hydrocarbon adsorber bypass passage being in a closed condition during the starting the engine when the ambient temperature is above 0 degrees Celsius and the hydrocarbon adsorber bypass passage being in an open condition during the starting the engine when the ambient temperature is below 0 degrees Celsius.

10. The control system of claim 9, wherein the adsorber bypass control module commands displacement of a valve within the hydrocarbon adsorber bypass passage to a closed position to close the hydrocarbon adsorber bypass passage.

11. The control system of claim 9, wherein the hydrocarbon adsorber bypass passage is open at the key-on condition.

12. The control system of claim 9, wherein the adsorber bypass evaluation module determines an engine torque output and the adsorber bypass control module opens the hydrocarbon adsorber bypass passage after the closing when the determined engine torque output is greater than a predetermined limit.

13. The control system of claim 9, wherein the adsorber bypass evaluation module determines a vehicle accelerator pedal position and the adsorber bypass control module opens the hydrocarbon adsorber bypass passage when the vehicle accelerator pedal position is greater than 50 percent of a maximum vehicle accelerator pedal position.

14. The control system of claim 9, wherein the adsorber bypass evaluation module determines an operating temperature of a catalyst of the engine exhaust gas treatment device and the adsorber bypass control module opens the hydrocarbon adsorber bypass passage when the operating temperature of the catalyst is greater than 300 degrees Celsius.

15. The control system of claim 14, wherein exhaust gas flows in a first direction through the hydrocarbon adsorber when the adsorber bypass passage is closed and the exhaust gas flows in a second direction opposite the first direction through the hydrocarbon adsorber when the adsorber bypass passage is open.

16. The control system of claim 15, wherein the hydrocarbon adsorber is operating at a temperature greater than 300 degrees Celsius when the exhaust gas flows through the hydrocarbon adsorber in the second direction.

* * * * *